(12) United States Patent
Choi

(10) Patent No.: US 12,361,019 B2
(45) Date of Patent: *Jul. 15, 2025

(54) SYSTEMS AND METHODS FOR DISTRIBUTED ENTITY TRACKING

(71) Applicant: Sequoia Games, Inc., Yorba Linda, CA (US)

(72) Inventor: Daniel Choi, Yorba Linda, CA (US)

(73) Assignee: Sequoia Games, Inc., Yorba Linda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,296

(22) Filed: Dec. 18, 2023

(65) Prior Publication Data

US 2024/0184804 A1 Jun. 6, 2024

Related U.S. Application Data

(63) Continuation of application No. 17/899,503, filed on Aug. 30, 2022, now Pat. No. 11,847,136, which is a continuation-in-part of application No. 17/833,840, filed on Jun. 6, 2022, now Pat. No. 11,989,800, which is a continuation of application No. 17/464,610, filed on Sep. 1, 2021, now Pat. No. 11,354,826.

(60) Provisional application No. 63/145,317, filed on Feb. 3, 2021, provisional application No. 63/073,684, filed on Sep. 2, 2020.

(51) Int. Cl.
*G06F 16/00* (2019.01)
*A63F 13/65* (2014.01)
*A63F 13/79* (2014.01)
*G06F 16/27* (2019.01)

(52) U.S. Cl.
CPC .............. *G06F 16/27* (2019.01); *A63F 13/65* (2014.09); *A63F 13/79* (2014.09); *A63F 2300/5546* (2013.01); *A63F 2300/69* (2013.01)

(58) Field of Classification Search
CPC .......... G06F 16/27; A63F 13/65; A63F 13/79; A63F 2300/5546; A63F 2300/69
See application file for complete search history.

(56) References Cited

U.S. PATENT DOCUMENTS

2019/0057454 A1* 2/2019 Komenda ............. H04L 9/3242
2020/0021649 A1* 1/2020 Natanzon ............ H04L 67/1095
(Continued)

*Primary Examiner* — Alexander Khong
(74) *Attorney, Agent, or Firm* — Pierson Ferdinand LLP; Daniel Rose

(57) ABSTRACT

In some aspects, the disclosure is directed to methods and systems for secure and authenticated tracking of entity possession via a lightweight centralized or distributed ledger. Ownership records of different entities may be recorded on an immutable ledger such that provenance of the entities is verifiable and a user cannot create or counterfeit an entity. In some implementations, the system may store metadata of entities in a separate database that may store records for each entity and correspond to the respective entity's virtual identifier, enabling the ledger records to contain much less data, saving memory resources and the energy that is required to maintain the ledger. In some implementations, distributed incremental values may be provided to members of an ownership or possession chain of an entity, which may encourage compliance, reporting of ownership transfer, and encourage additional transfers.

20 Claims, 8 Drawing Sheets

(56) References Cited

U.S. PATENT DOCUMENTS

| | | | |
|---|---|---|---|
| 2020/0034457 A1* | 1/2020 | Brody | H04L 9/0819 |
| 2020/0202668 A1* | 6/2020 | Cotta | G07F 17/3244 |
| 2020/0252404 A1* | 8/2020 | Padmanabhan | H04L 63/061 |
| 2020/0374105 A1* | 11/2020 | Padmanabhan | H04L 9/085 |
| 2021/0042738 A1* | 2/2021 | Edwards | G06Q 20/38 |
| 2021/0165828 A1* | 6/2021 | Xiang | G06F 16/2456 |
| 2021/0176280 A1* | 6/2021 | Jayanthi | G06F 8/34 |

\* cited by examiner

SYSTEMS AND METHODS FOR DISTRIBUTED ENTITY TRACKING

CROSS-REFERENCE TO RELATED APPLICATIONS

The present application claims the benefit of and priority as a continuation of U.S. Nonprovisional application Ser. No. 17/899,503, entitled "Systems and Methods for Distributed Entity Tracking," filed Aug. 30, 2022; which claims priority as a continuation-in-part to U.S. Nonprovisional Application No. 17/833.840, entitled "Systems and Methods for Augmented Reality Environments and Tokens," filed Jun. 6, 2022; which claims priority as a continuation to U.S. Nonprovisional application Ser. No. 17/464,610, entitled "Systems and Methods for Augmented Reality Environments and Tokens," filed Jun. 7, 2022; which claims priority to U.S. Provisional Application No. 63/073,684, filed Sep. 2, 2020, and U.S. Provisional Application No. 63/145,317, filed Feb. 3, 2021, the entirety of each of which is incorporated by reference herein.

FIELD OF THE DISCLOSURE

This disclosure generally relates to systems and methods for distributed entity tracking. In particular, this disclosure relates to systems and methods for secure and authenticated tracking of entity possession via a centralized or distributed ledger.

BACKGROUND OF THE DISCLOSURE

Entity tracking and management of ownership or possession of entities allows for authentication of the entities, helping to prevent counterfeiting or fraud. However, many implementations of entity tracking and management of ownership or possession of entities suffer from issues related to security and trust: the tracking system, such as a database or other centralized ledger, may not necessarily be trusted by all entity owners or possessors, as it may be vulnerable to modification by other entity owners, malicious third parties, or even the ledger administrator or operator. Distributed ledgers provide a degree of trust through immutability, but may be inefficient, have high operation costs, and may be unable to hold significant amounts of data related to entities.

SUMMARY OF THE DISCLOSURE

Implementations of the systems and methods discussed herein provide for secure and authenticated tracking of entity possession via a lightweight centralized or distributed ledger.

Ownership records of different entities may be recorded on an immutable ledger such that provenance of the entities is verifiable and a user cannot create or counterfeit an entity. One example of such a record system may be a distributed ledger such as a blockchain, which may be a distributed ledger that is maintained and verified by multiple nodes or computing devices. Verifiable ownership may be particularly useful when entities are non-fungible or non-replaceable or have particular value through their authenticated origin. With successive transfers of possession or ownership, it may be difficult to reliably track the source of an entity, particularly if the source does not create any visually distinctive or apparent features in the entity that can distinguish it from similar or identical entities from different sources. Thus, it may be useful to maintain an immutable chain of ownership on a ledger for individual tokens to avoid counterfeits.

One drawback to using distributed ledgers to maintain a chain of ownership is that such ledgers can often require a large amount of processing resources to maintain. Use of such processing resources may cause the computers that maintain the system to use a large amount of energy. For example, as users perform more and more transactions and trade physical entities with each other, a blockchain may require more and more processing resources and energy to maintain. Given that blocks on the blockchain may contain additional data about entity (e.g. metadata or other information), each transaction that includes information for the entity may substantially increase the amount of memory and energy that is required to validate the transaction block for the transaction and maintain the blockchain.

Implementations of the systems and methods described herein may overcome the above-described technical deficiencies by avoiding placing the metadata for the entities on the ledger. Instead, the system may store the metadata in a separate database that may store records for each entity and correspond to the respective entity's virtual identifier. The records on the ledger may only include information indicating ownership of the entity was transferred to a different user account without any metadata for the entity. Accordingly, while the number of records on the blockchain may remain substantially the same compared to previous systems, implementations of the system and methods described herein may enable the records to contain much less data, saving memory resources and the energy that is required to maintain the ledger.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
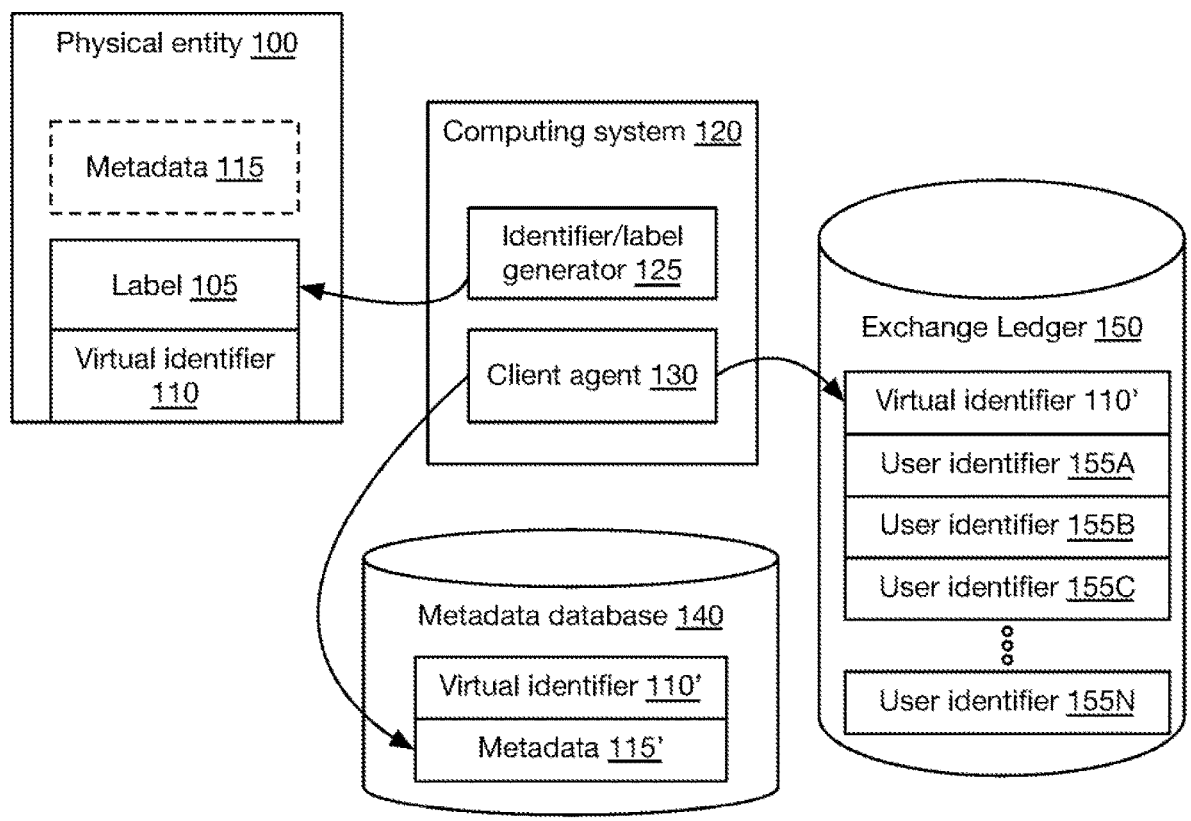
FIG. 1 is a block diagram of an implementation of a system for providing distributed entity tracking.

For purposes of reading the description of the various embodiments below, the following descriptions of the sections of the specification and their respective contents may be helpful:
Section A describes embodiments of systems and methods for distributed entity tracking; and
Section B describes a computing environment which may be useful for practicing embodiments described herein.

A. Systems and Methods for Distributed Entity Tracking

Entity tracking and management of ownership or possession of entities allows for authentication of the entities, helping to prevent counterfeiting or fraud. As used herein, an entity or entities may refer to any physical item or items, such as a computing device, portable device, appliance, or other electronic device; a vehicle or other machine; personal property such as clothing, watches, paintings, toys, or collectable items; real property; machine components or other manufacturing items; food or food components or ingredients; or any other tangible item. Tracking of such entities may be important for ensuring validity, safety (e.g. food safety or cybersecurity), or otherwise authenticating an entity's history of possession or ownership. In many cases, entities may be fungible, identical or substantially identical except for their ownership or possession histories, which may be an important distinction in value. For example, an apple may be apparently identical to another apple, but the former may come from a carbon-neutral organic local farm while the latter comes from a large factory farm and shipped across country. In another example, a basketball jersey identical to those purchasable in a store may have particular value as having been worn by a player during a championship game. An end recipient may thus place substantial value on ensuring that the entity has an authenticated source, even if it's otherwise apparently identical to other entities.

However, many implementations of entity tracking and management of ownership or possession of entities suffer from issues related to security and trust: the tracking system, such as a database or other centralized ledger, may not necessarily be trusted by all entity owners or possessors, as it may be vulnerable to modification by other entity owners, malicious third parties, or even the ledger administrator or operator. For example, as discussed above, an entity may be apparently identical to others, but have significant value through its origin or ownership history. An untrustworthy party may attempt to modify ownership records in order to enhance the value of an entity in their possession. Distributed ledgers provide a degree of trust through immutability, but may be inefficient, have high operation costs, and may be unable to hold significant amounts of data related to entities.

Implementations of the systems and methods discussed herein provide for secure and authenticated tracking of entity possession via a lightweight centralized or distributed ledger. Ownership records of different entities may be recorded on an immutable ledger such that provenance of the entities is verifiable and a user cannot create or counterfeit an entity. One example of such a record system may be a distributed ledger such as a blockchain, which may be a distributed ledger that is maintained and verified by multiple nodes or computing devices. Verifiable ownership may be particularly useful when entities are non-fungible or non-replaceable or have particular value through their authenticated origin. With successive transfers of possession or ownership, it may be difficult to reliably track the source of an entity, particularly if the source does not create any visually distinctive or apparent features in the entity that can distinguish it from similar or identical entities from different sources. Thus, it may be useful to maintain an immutable chain of ownership on a ledger for individual tokens to avoid counterfeits.

One drawback to using distributed ledgers to maintain a chain of ownership is that such ledgers can often require a large amount of processing resources to maintain. Use of such processing resources may cause the computers that maintain the system to use a large amount of energy. For example, as users perform more and more transactions and trade physical entities with each other, a blockchain may require more and more processing resources and energy to maintain. Given that blocks on the blockchain may contain additional data about entity (e.g. metadata or other information), each transaction that includes information for the entity may substantially increase the amount of memory and energy that is required to validate the transaction block for the transaction and maintain the blockchain.

Implementations of the systems and methods described herein may overcome the above-described technical deficiencies by avoiding placing the metadata for the entities on the ledger. Instead, the system may store the metadata in a separate database that may store records for each entity and correspond to the respective entity's virtual identifier. The records on the ledger may only include information indicating ownership of the entity was transferred to a different user account without any metadata for the entity. Accordingly, while the number of records on the blockchain may remain substantially the same compared to previous systems, implementations of the system and methods described herein may enable the records to contain much less data, saving memory resources and the energy that is required to maintain the ledger.

Implementations of these systems and methods may also provide another benefit through providing distributed incremental values to members of an ownership or possession chain of an entity, which may encourage compliance, reporting of ownership transfer, and even encourage transfers themselves. Specifically, in some implementations, responsive to a transfer of ownership or possession of an entity, a value may be added to an account associated with each prior owner or possessor of the entity. Such values may be non-uniform in many instances, or may be apportioned according to one or more functions (e.g. providing a higher incremental value to earlier possessors, providing a higher incremental value to later possessors, providing higher incremental values to earlier and later possessors but not intermediate possessors, etc.). In many implementations, the total incremental value may be included as part of a transaction cost for recording a transfer.

Referring first to FIG. 1, illustrated is a block diagram of an implementation of a system for providing distributed tracking of one or more physical entities 100. As discussed above, an entity 100 may comprise any type and form of physical item, including real property, personal property, machines, devices, electronics, collectables, clothing, food, ingredients or components, or any other type and form of item. An entity may have or be associated with metadata 115, which may comprise information about the entity, including a name, identifier or GUID, type, model, make, dimensions, size, description, or any other type and form of information. Metadata 115 may be explicitly encoded or written (e.g. a visible label, trademark, brand, etc.) or may be implicit or inherent (e.g. dimensions, a description, etc.). Accordingly, in many implementations, metadata 115 may not be explicitly present in or on an entity 100 but may rather be inherent information about the entity 100.

In many implementations, the system may comprise a computing system 120, which may include one or more computing devices (e.g. desktop computers, workstations, rackmount computers, laptop computers, cluster computers, computing appliances, or any other type and form of computing devices), storage devices (e.g. RAID arrays, hard drives, solid state drives, network storage devices, or any other type and form of storage device), and/or network devices (e.g. switches, hubs, routers, firewalls, accelerators, gateways, modems, or any other type and form of network device).

Computing system 120 may comprise an identifier and/or label generator 125. Identifier and/or label generator 125 (which may be referred to variously as an identifier generator, label generator, identifier and label generator, labeler, tracker, or any other similar name) may comprise hardware and/or software for generating a virtual identifier 110 for tracking an entity 100 and/or for generating labels for affixing virtual identifiers 110 to physical entities 100. A virtual identifier 110 may comprise an alphanumeric identifier, binary or hexadecimal string, unique name, or any other type and form of identifier that may be unique to a physical entity 100 (and may be more unique than a name for a fungible entity generally). Accordingly, in many implementations, an identifier generator may comprise a random number generator or pseudorandom number generator, counter, clock or timestamp generator, or other such structures, which may be realized in physical circuitry and/or in software. For example, in some implementations, an identifier generator may comprise a hardware random number generator and a software routine for retrieving a timestamp from a network clock and calculating a hash result from the random number and timestamp to generate a unique and randomized virtual identifier. In another implementation, an identifier generator may comprise a counter and/or array of used identifiers, and may assign a next available virtual identifier to a physical entity 100.

A virtual identifier 110 may be affixed to a physical entity 100 via a label 105, engraving, painting, marking, printing, or other such methods. For example, in some implementations, a label generator 125 may create a label 105 (e.g. tamper-evident or non-removable label) with a virtual identifier 110 encoded or printed on the label 105, to be affixed to a corresponding physical entity 100. Virtual identifier 110 may be encoded in various formats, including as an alphanumeric or numeric string, a barcode, a QR code, a bitmap, or any other type and form of visual or detectable encoding. In other implementations, a label generator 125 may create a label 105 comprising a NFC circuit encoded with a virtual identifier for scanning and decoding by a portable computing device or label reader. In other implementations, a label generator 125 may engrave or print a virtual identifier on a physical entity (e.g. on a nameplate, on a normally visible surface, on a normally hidden surface such as underneath the entity or within an enclosure or compartment, etc.), which may be similarly referred to as a label 105. In some implementations, a label generator 125 may create a label 105 comprising a non-visible code or one not easily perceivable by humans, such as a watermark or steganographic code within an image (e.g. microdot code), an identifier encoded in IR reflective material within an otherwise visible image, etc. In many implementations, the virtual identifier 110 may be affixed to the physical entity 100 such that modification or destruction of the virtual identifier 110 is immediately apparent (e.g. via a tamper-evident label, tape, or coating, etc.).

In some implementations, the virtual identifier 110 may be affixed to the physical entity 100 via software or firmware, such as in a startup screen, configuration or about screen or menu, or similarly displayable via a user interface. The virtual identifier 110 may be affixed such that modification is not possible (e.g. via encoding in one-time programmable (OTP) memory, encoding in fusible memory with a fuse subsequently burned or, otherwise fixed in memory). Accordingly, software-based encoding of a virtual identifier 110 may be referred to as a label 105 in some implementations.

Computing system 120 may comprise or execute a client agent 130, which may comprise hardware, software, or a combination of hardware and software for tracking entities 100 and virtual identifiers 110. In many implementations, a client agent 130 may maintain and/or communicate with other computing devices maintaining a metadata database 140 and an exchange ledger 150. Metadata database 140 may comprise a database, separate from exchange ledger 150, for storing metadata 115' about each physical entity 100 in association with a corresponding virtual identifier 110'. Metadata database 140 may comprise an array, flat file, XML file, SQL database, or any other type and format of data structure for storing metadata in any suitable format. Metadata may be indexed by corresponding virtual identifiers 110' in many implementations for ease of retrieval.

Exchange ledger 150 may comprise a centralized or decentralized ledger and may be stored on one or more computing devices. In many implementations, exchange ledger 150 may comprise an immutable database, such as a blockchain database, a mutable ledger or database, or any other type of data record. In some implementations, the ledger may store the virtual identifier 110' in association with a user identifier 155, and/or chain of user identifiers 155A-155N indicating a chain of transactions or trades of the associated token. With an immutable ledger, for example, this may provide a secure record of possession of an entity 100 and prevent counterfeiting and duplication. In many implementations, a virtual identifier 110' may be used as an address or index within the centralized or distributed ledger, allowing for easy retrieval of a chain of user identifier records based on the virtual identifier. In other implementations, the address may be derived from the virtual identifier, such as a hash of the identifier, a digitally signed version of the identifier (e.g. signed by the computing system 120). In still other implementations, the address of the records for the virtual identifier 110' may be stored in corresponding metadata 115' in a metadata database 140. This may allow for some access control to records within the ledger by requiring accessing devices or users to first access the metadata database (which may be more tightly controlled) before accessing records in a distributed ledger (which may not be as tightly controlled). In some implementations, records within the exchange ledger 150 may be encrypted via a key stored in metadata 115' in a metadata database 140, similarly providing some level of access control. User identifiers 155A-155N may comprise alphanumeric strings, binary strings, hexadecimal data, GUIDs, login names, email addresses, or any other type and form of unique identifier. In some implementations, user identifiers may have a hierarchical format (e.g. organization-unique user, or similar multi-layer formats). Although referred to as user identifiers, in many implementations, the identifiers may represent specific devices of a user (e.g. a laptop computer, desktop computer, wearable computer, tablet computer, appliance, home automation system, etc.). Accordingly, user identifiers should be considered to identify a user and/or a device associated with the user.

As discussed above, in some implementations, incremental values may be provided to members of an ownership or possession chain of an entity, which may encourage compliance, reporting of ownership transfer, and even encourage transfers themselves. Specifically, in some implementations, responsive to a transfer of ownership or possession of an entity 100, a value may be added to a user account 155 associated with each prior owner or possessor of the entity. Such values may be non-uniform in many instances, or may be apportioned according to one or more functions (e.g. providing a higher incremental value to earlier possessors, providing a higher incremental value to later possessors, providing higher incremental values to earlier and later possessors but not intermediate possessors, etc.). In many implementations, the total incremental value may be included as part of a transaction cost for recording a transfer.

Figure 2A:
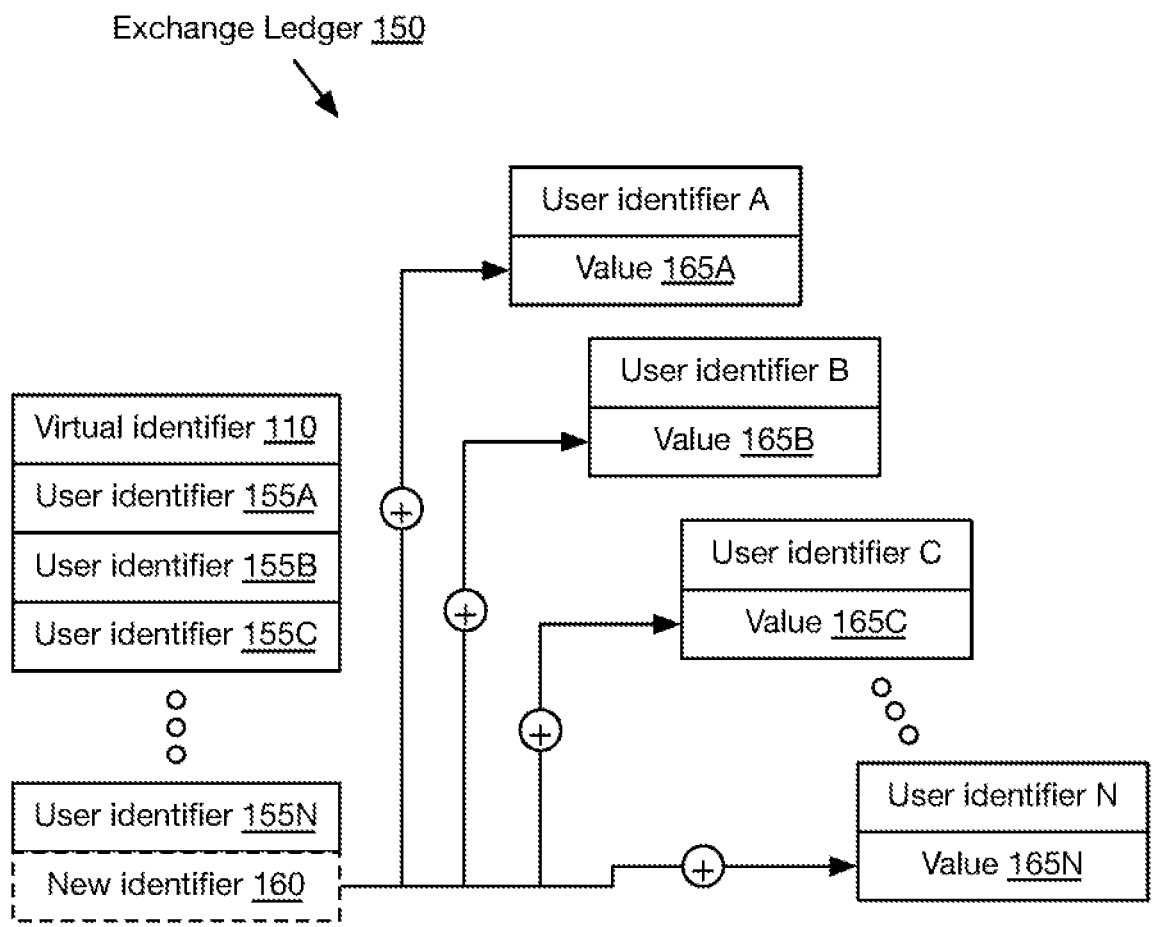
FIG. 2A is an illustration of providing incremental distributed values to prior entity possessors, in some implementations of systems for providing distributed entity tracking.

FIG. 2A is an illustration of providing incremental distributed values to prior entity possessors, in some implementations of systems for providing distributed entity tracking. As shown, a record may exist in a centralized or distributed exchange ledger 150 including a virtual identifier 110 and a chain of user identifiers 155A-155N, each user identifier added responsive to a request to authenticate or record a change of ownership or possession of a corresponding physical entity 100. Upon receipt of a new request to record a change of ownership comprising a new user identifier 160, values 165A-165N associated with each corresponding user identifier 155A-155N may be incremented by an amount or percentage, in various implementations. The value may represent an amount of currency associated with a user account in some implementations, or may represent an amount of exchange participation credits, trust credits, or any other such value. For example, in some implementations, users or devices corresponding to user identifiers may be rated as more or less trustworthy based on the number of exchange credits allocated to their accounts, indicating that they've been a long-time participant within the exchange system.

Figure 2B:
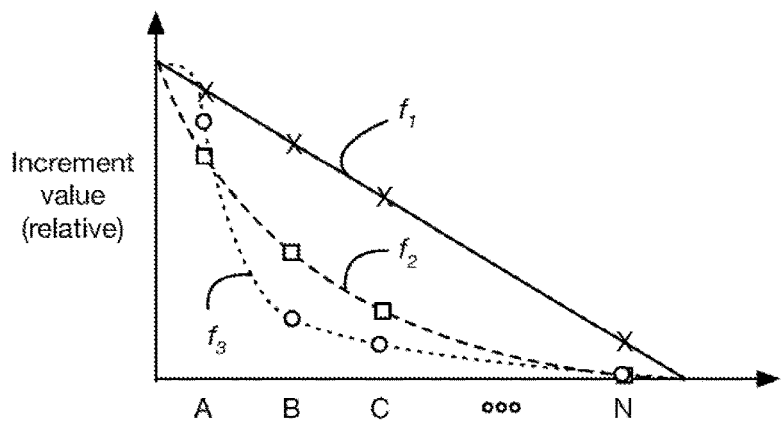
FIG. 2B is an illustration of different incremental value functions for implementations of the system of FIG. 2A.

In some implementations, the amount each value 165A-165N is incremented by may be identical. In other implementations, the amounts may vary according to predetermined amounts, percentages, or functions. For example, FIG. 2B is an illustration of different incremental value functions for implementations of the system of FIG. 2A. As shown, various functions may be utilized such as a linear function ($f_1$) with each later possessor having a proportionally smaller incremented value; an exponential or geometric function ($f_2$) that more heavily weights earlier possessors; or a complex function ($f_3$) that provides even greater weighting. Although not illustrated, other functions may be utilized or these functions may be reversed (e.g. with later possessors having higher increment values relative to earlier possessors).

Figure 2C:
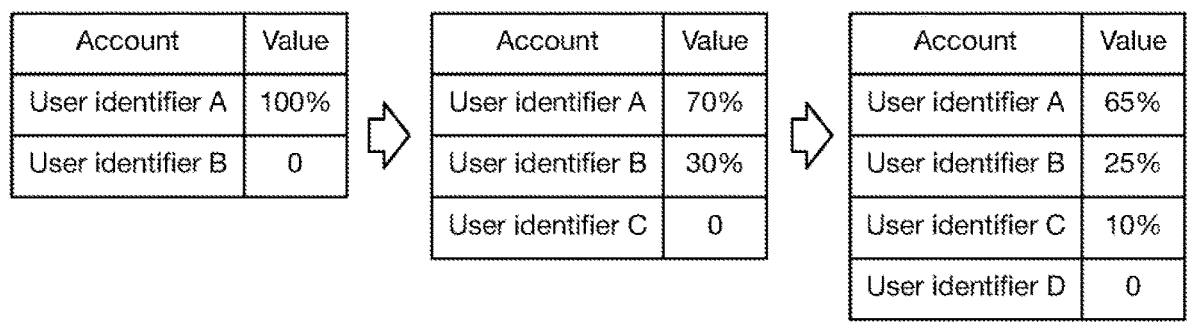
FIG. 2C is a tabular illustration of application of different incremental value functions for implementations of the system of FIG. 2A.

In some implementations, incremental value functions may be varied based on the number of user identifiers in a possession chain. For example, FIG. 2C is a tabular illustration of application of different incremental value functions for implementations of the system of FIG. 2A. While the value increment is shown as percentages, in many implementations, a predetermined increment value may be divided by the percentages shown before being added to the corresponding user values (e.g. a value of 1 may correspond to 100%, 0.5 corresponding to 50%, etc.). In the implementation illustrated, with a first exchange of an entity from user A to user B (or device A to device B), a value associated with user A may be incremented by a predetermined amount (e.g. 100% of a predetermined amount). In a subsequent exchange from user B to user C (or device B to device C), a value associated with user A may be incremented by 70% of a predetermined amount, and a value associated with user B may be incremented by 30% of a predetermined amount. In a further subsequent exchange from user C to user D, a value associated with user A may be incremented by 65% of a predetermined amount, a value associated with user B may be incremented by 25% of a predetermined amount, and a value associated with user C may be incremented by 10% of a predetermined amount. In other implementations, other values or percentages may be used as discussed above. For example, in some implementations, an intermediate possessor may receive no incremented value (0%) or a negligible amount (0.01%), etc. The incremented value, amount, or percentage may be based on any base or initial amount, such as a predetermined exchange or transaction amount or value; a value based on or equal to an amount exchanged between a prior possessor and a new possessor of the physical entity; an amount proportional to an amount exchanged between a prior possessor and a new possessor of the physical entity (e.g. 10%, 20%, 50%, or any other such value), or any other amount.

Such a system of providing incremental values to prior possessors in a chain may encourage compliance and recordation of transfers, as well as encouraging transfers of entities generally. For example, if a physical entity is a valuable collectible, a possessor may be incentivized to trade their entity knowing that in addition to any value obtained immediately during the trade, they may also receive value for further trades by subsequent possessors. This may also incentivize users to add value to items (e.g. adding additional associated metadata, etc.), as well as incentivizing originators of physical entities to create them and trade them, potentially for lower initial value than they may have previously sought.

Figure 3:
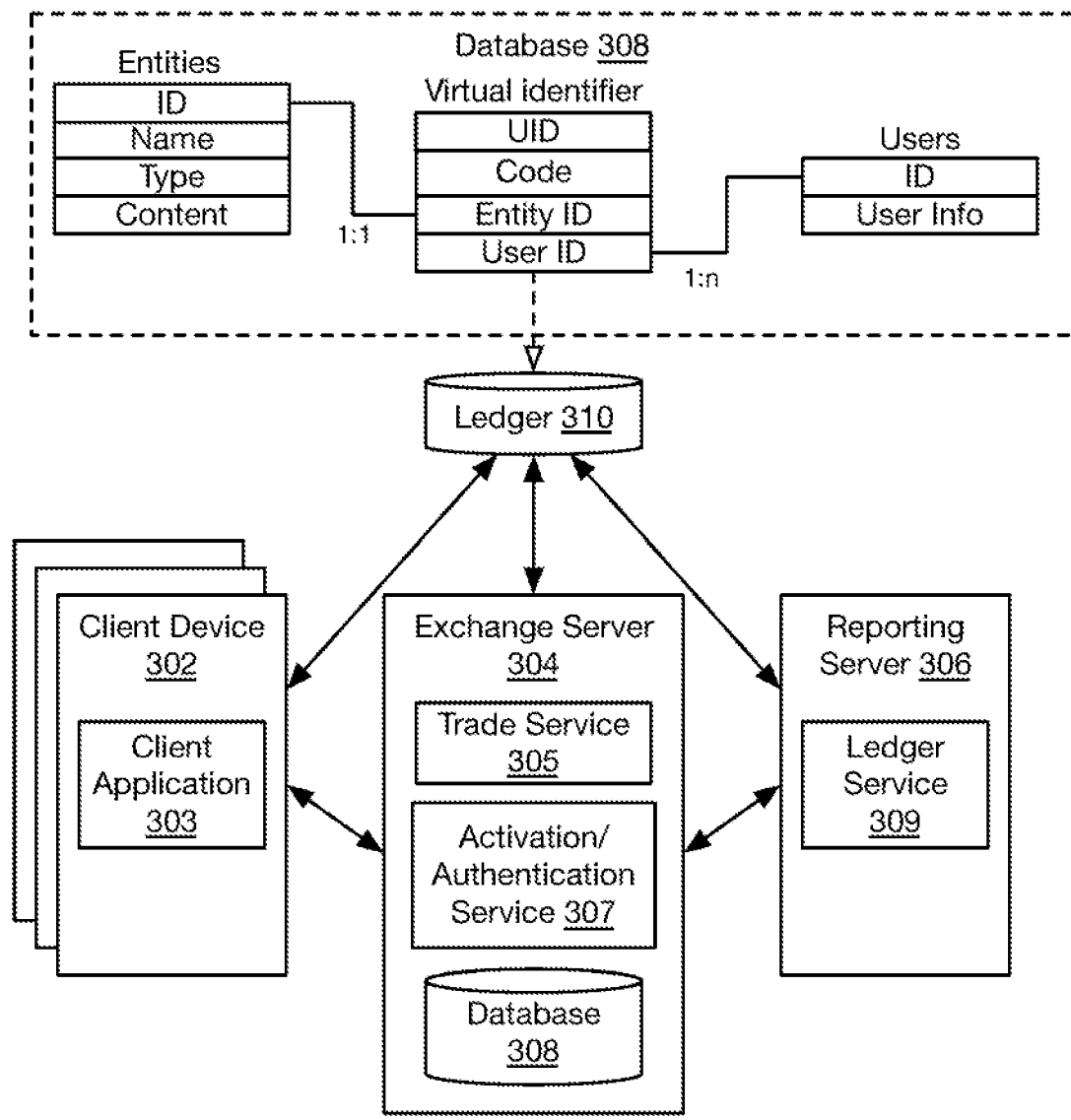
FIG. 3 is a block diagram of an implementation of a system for providing distributed entity tracking.

FIG. 3 is a block diagram of an implementation of a system for providing distributed entity tracking. Client device(s) 302 executing client applications 303 such as web browsers, apps, or exchange applications may communicate with each other and, in some implementations, with an exchange server 304. Exchange server 304 may comprise a computing device or cluster or farm of computing devices or a cloud of virtual computing devices executed by one or more physical devices for managing trading and/or authentication of physical entities and recording trades and/or activation of entities in a database 308. Exchange server 304 may comprise one or more processors, memory devices, and network interfaces (not illustrated), and may execute one or more servers or services (e.g. remote procedure call or RESTful services or microservices, sometimes referred to as Software as a Service or SaaS services) for trading and entities activation or authentication. Exchange server 304 may comprise a computing system 120.

As discussed above, physical entities may be or include any object or objects in a real environment, and may be associated with a virtual identifier which may be affixed to or otherwise placed upon or in a physical entity so that a user can read or scan (e.g., via a client application) the virtual identifier and view information about or otherwise authenticate the entity.

When first received by the system, a physical entity may be "activated" or entered into the exchange system by recording an entity-specific identifier or code or creating a new database entry for the entity-specific identifier or code. This may be done at time of manufacture of the entity (e.g. by the manufacturer or system provider) or may be done subsequently by a user or initial purchaser or possessor (e.g. via a client application 303). In some implementations in which activation is performed by a user, the virtual identifier may also be associated with a user identifier in the database, the user identifier associated with the activating user. As discussed above, user identifiers may comprise any type and form of code, such as an alphanumeric string, hash identifier, index, username, or any other such identifier. In other implementations in which activation is performed by a manufacturer, an entity may be initially associated with a user identifier for the manufacturer (or identifier of a group of users or organization). In still other implementations, a physical entity may initially not be associated with a user identifier after manufacture; an association with the user identifier associated the first subsequent possessor or purchaser may be recorded to the database, upon receipt of a request to register or authenticate a token by a client device 302 associated with the user. Such requests may comprise an identifier read or scanned from the physical entity or generated by an exchange server 304 or identifier/label generator as discussed above (e.g. a physical code printed, engraved, or embedded on the token or encoded in a machine readable format, such as a barcode or QR code), and a user identifier or client identifier. Similarly, physical entities may be traded between users by providing a request comprising a virtual identifier of the entity and a new user identifier or client identifier to be associated with the entity. In some implementations, the request may be authenticated and/or may comprise an identifier of a user or client presently associated with the entity. Requests to transfer or trade tokens may be secured via any appropriate means, such as authenticated via a cryptographic signature associated with the user or client, provided after the client device logs in or otherwise authenticates with the exchange server 304, etc.

Database 308 may, in some implementations, comprise a relational database or other data structure for storing data about physical entities and/or users. Each entity may be associated with metadata, which may comprise a unique or semi-unique identifier; a name; a type; or any other such metadata (e.g. images, descriptive text, sounds, animations or videos, etc.).

Each physical entity may be identified with a record in database 308 comprising a unique virtual identifier or UID of the entity and, in some implementations, a code such as a visual code, barcode, QR code, alphanumeric code, or other encoding of the UID for machine-readability or scanning or entry by a user; and an associated metadata record identifier. In some implementations, once activated or associated with a user, the entity record may also be associated with a user identifier. In some implementations, a single user identifier may be recorded; while in other implementations, a series of user identifiers may be stored, representing each successive possessor or owner of an entity, with new user identifiers added in response to a trade request.

Database 308 may also comprise user records, which may include a user or client identifier and, in some implementations, information about a user or client (e.g. device type, address information, capabilities, or any other type and form of information). In some implementations in which personal information is stored, users may have the ability to configure and control which and/or whether information is stored to protect privacy. As discussed above, user or client identifiers may be associated with each virtual identifier record (e.g. indicating a current possessor or owner of a corresponding physical entity), and in some implementations, virtual identifier records may comprise a plurality of user identifiers (e.g. an ordered list of subsequent owners or possessors). For example, a physical entity first possessed by user #01, then traded to user #02, then subsequently traded to user #03 may be associated with a record including a string of user identifiers 01;02;03. Such identifiers may be concatenated with or without delimiters, stored in separate fields in an array, or any other type and form of storage.

In another similar implementation, virtual identifiers and/or user identifiers may be associated with addresses in a centralized or distributed ledger managed by a reporting server 306, and transactions recorded against the address indicating an exchange or trade. For example, in one such implementation, a blockchain ledger may be created with virtual identifiers as addresses. When a physical entity (e.g. with identifier A1) is first possessed by a first user (e.g. user B1), a record may be recorded to an address A1 identifying B1. Subsequently, if the physical entity is transferred to a second user (e.g. user B2), a second record may be recorded to address A1 identifying the transfer from B1 to B2. Each new record may be recorded within a new block of a blockchain to provide an immutable but easily searchable record. In some implementations, the above system may be reversed, with user identifiers used as addresses, and virtual identifiers recorded to addresses corresponding to a possessing user (e.g. with physical entity A1 recorded first to address B1, then subsequently from address B1 to address B2, using the exchange example discussed above). Each implementation may have particular advantages for searching for either specific user records or specific virtual identifier records. In a further implementation, these systems can be combined, with addresses for both virtual identifiers and users, and with user identifiers recorded to virtual identifier addresses and virtual identifiers recorded to user addresses. While this may increase the number of records required (and the corresponding bandwidth and storage requirements), such a system may be easily indexed or searched by both virtual identifier and user records, each of which may be useful at different times (e.g. searching for a list of transactions associated with a particular physical entity to authenticate the physical entity or ensure that it is not counterfeit; or searching for all physical entity transactions associated with a particular user to identify all physical entities owned or possessed by the user, regardless of when acquired).

In some implementations, the aforementioned distributed ledger system for managing physical entity ownership may be used to certify ownership of physical entities as the entities are traded. For example, in one such implementation, a first user A may purchase a physical entity and register his ownership on a blockchain that maintains records of ownership for that physical entity (e.g., generate a block instance that contains an identifier of user A as the owner). The first user A may then trade the physical entity to a second user B who may update the blockchain for the physical entity with a new block instance to indicate that the second user B is now the owner of the physical entity. The users may continue to trade the physical entity to further users and create new block instances for each change in ownership. Consequently, when a user (e.g., user E) is considering obtaining the physical entity from another user (e.g., user D), user E may look at the blockchain records for the physical entity and make sure there is a continuous chain back to the manufacturer (e.g., a chain without any breaks or changes in the corresponding virtual identifier's data between block instances). If user E determines there is a continuous chain of ownership for the physical entity and that the virtual identifier has not manipulated in any manner, user E may determine the physical entity is not counterfeit or is authentic.

In some implementations, the exchange server 304 may analyze the blockchain records of individual virtual identifiers to verify the corresponding physical entities are not counterfeits. If the exchange server 304 determines there are any breaks in the blockchain (e.g., a buyer purchases the physical entity from a user that was not recorded as having bought the physical entity) the exchange server may determine the physical entity is a counterfeit or the virtual identifier has been tampered with. In some implementations, exchange server 304 may similarly analyze the chain of ownership for a physical entity based on the user identifiers on the block instances and determine if there are any irregularities in the chain. If the exchange server 304 identifies any irregularities in the user identifiers or otherwise determines a physical entity is a counterfeit, the exchange server 304 may "deactivate" the virtual identifier to prevent further exchanges. Because the ledger system is immutable, any unidentified changes in ownership or changes in the data of individual block instances may be immediately apparent as the change would cause a break in the blockchain. Thus, a self-monitoring system may be created using a blockchain ledger that can automatically stop counterfeiters from creating or manipulating virtual identifiers or counterfeit physical goods. Implementations of this system may be utilized in various industries, including tracking production and manufacturing materials; crops or livestock; etc. For example, each pallet of products in a warehouse may be associated with a virtual identifier which may be scanned to retrieve and display additional data about the products (e.g. manufacture or expiration dates or locations, storage requirements, dimensions or weights, shipping destinations, etc.) for display. As the pallet is moved from a warehouse to a distributor to a retail terminal, the ledger record associated with the virtual identifier may be updated with new location or company information.

Figure 4:
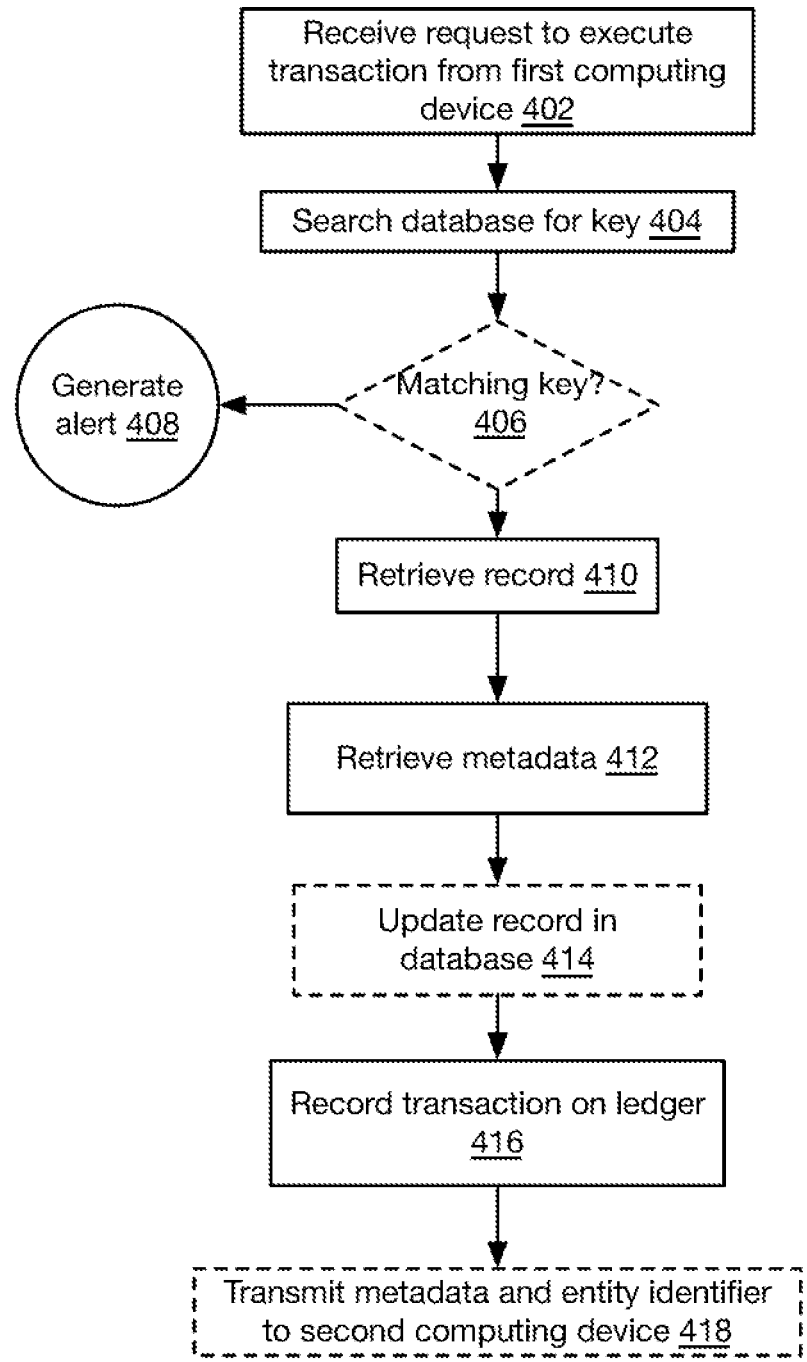
FIG. 4 is a flow chart of an implementation of a method for reducing memory requirements for distributed entity tracking.

FIG. 4 is a flow chart of an implementation of a method for reducing the memory requirements for storing data for a distributed entity tracking system. At step 402, a computing device in communication with a centralized or distributed ledger may receive, from a computing device associated with a first user account (e.g., a computing device processing the first user account), a request to execute a transaction to transfer ownership of a physical entity from the first user account to a second user account. The computing device may be a node that helps to maintain the ledger or may be a separate computing device that has previously established a communication channel with one or more of the nodes that maintain the ledger. In some implementations, the ledger may be a blockchain that is distributed and is publicly accessible (e.g., Bitcoin, Dogecoin, Ethereum, etc.) or a private blockchain that is only accessible to certain subset of individuals with write access to the blockchain such as individuals who have a wallet or account for which the blockchain is storing ownership records.

In some implementations, the request may include an identifier of the physical entity for which ownership is being transferred (e.g. virtual identifier). The virtual identifier may be a numerical, alphanumerical, or alphabetic string that individually identifies the physical entity. In some implementations, the virtual identifier may be written on or affixed to the physical entity such as via a label including a string or a barcode.

At step 404, the first computing device may search a database that includes records for virtual identifiers. The database may be a database stored within the first computing device or a database stored within a remote computing device. The database may store a record for each virtual identifier. For example, each physical entity with a unique virtual identifier may have its own record in the database. Each record may store metadata about the respective physical entity in various fields. Examples of such fields may include the current owner of the physical entity, a transaction history indicating the history of ownership of the physical entity, an event history of the physical entity that indicates various events that have occurred to the physical entity (e.g., the physical entity was manufactured, the physical entity was moved out of the country, the physical entity was damaged, etc.), any signatures on the physical entity, an entity identifier (e.g., a name of the entity represented by the virtual identifier), an entity type, etc. In some implementations, metadata is stored in a single field or a combination of data-specific fields and one or more general fields.

At step 406, the first computing device may determine if there is a matching key in the database. The first computing device may search the database using the virtual identifier received in the request as an index to identify the record for the physical entity being transferred in the transaction. The first computing device may identify the different virtual identifiers (e.g., keys) in the database that correspond to records for different physical entities and determine if any of the stored virtual identifiers match the virtual identifier received in the request. If there is not a matching virtual identifier, at step 408, the first computing device may generate an alert indicating a record for the physical entity could not be found. The first computing device may transmit the alert to the first computing device or a second computing device associated with the second user account. In some implementations, if there is not a matching virtual identifier, the transaction may be voided and not executed on the ledger. In some implementations, the first computing device may still execute the transaction on the ledger but may not be able to retrieve any metadata about the physical entity if the first computing device is not able to identify a matching virtual identifier in the database.

However, if the first computing device can identify a matching virtual identifier, at step 410, the computing device may identify and retrieve the record that corresponds to the matching virtual identifier (e.g., identify the record based on the record's stored relationship with the matching virtual identifier). The first computing device may retrieve the record by accessing the data within the record and/or by retrieving the entire file of the record from memory. At step 412, the first computing device may identify the metadata that is stored in the record such as any events that have occurred to the physical entity, any signatures or other identifiers on the physical entity, an ownership history of the physical entity, etc. The first computing device may identify the metadata by extracting the metadata from the record.

In some implementations, at step 414, the first computing device may update the record for the physical entity to indicate the change in ownership. For instance, the first computing device may update an ownership field-value pair of the record to indicate ownership of the physical entity is being transferred from the first user account to the second user account. In doing so, the first computing device may add account identifiers for the first and/or second user accounts to the ownership field-value pair. In some implementations, the first computing device may indicate the change in ownership with a note in a general field of the record.

At step 416, the first computing device may record the transaction on the ledger. The first computing device may record the transaction on the ledger in a new record indicating that ownership of the physical entity has transferred from the first user account to the second user account. In doing so, the first computing device may create the record to include identifiers of the first user account and the second user account and the virtual identifier as the data of the record. In some implementations, the account identifiers and/or a short phrase indicating the transfer of ownership of the physical entity and the virtual identifier are the only pieces of data that are stored in the record. Accordingly, each time a new record gets added to the ledger, only the small amount of data indicating the transfer of ownership needs to be processed to validate the record. This may help avoid processing the data about the physical entity, which can be a significant amount of data. If a user wishes to view the entity-specific metadata about the physical entity, the user can access such data from the database that is separate from the ledger and that does not need to be processed for validation each time new data gets added to the database. Thus, the system enables ownership of individual entities to be confirmed over time using a ledger and for each entity to have entity-specific metadata without requiring excessive processing power to maintain a chain of ownership of the entity. This is a significant advance given that some ledgers are starting to require enough energy to power entire countries with the amount of data that is stored in each record.

In an example implementation, the ledger may be a blockchain that is maintained by multiple nodes. Upon receiving the transaction request transferring ownership of the physical entity from the first user account to the second user account, the first computing device may append a block to the blockchain. The first computing device may append the block to the blockchain by creating a hash based on the first account identifier, the second account identifier, the virtual identifier, and/or the address of the previous block, such that the block may attach to the blockchain and may include only the data that is necessary to indicate the transaction occurred in some implementations. In some implementations, the hash may be further based on a string containing a few characters indicating the transfer of ownership between the two accounts. In some implementations, the hash may not be based on any metadata for the entity.

Thus, each time the nodes that maintain the blockchain validate a new transaction or the blockchain itself, only a small amount of data needs to be processed. Previous systems would store any metadata about the entity in the block with the account identifiers and require such data to be used to create the hash for the block. The systems and methods described herein may avoid using this data by using a separate database to store the data (e.g., a database that does not require any validation). A virtual identifier for the physical entity may act as a key to map the new block for the transfer to the record for the token, so the entity may still have metadata that is specific to the entity and the system maintaining the ledger can avoid using processing resources to validate the metadata. Thus, by implementing the systems and methods described herein, a system may avoid using too much energy and processing power when validating blocks for transactions involving tracking entity ownership and/or possession.

At step 418, the first computing device may transmit the metadata that the device retrieved from the database to the second computing device associated with the second user account that is receiving ownership of the physical entity. The first computing device may transmit any subset of the metadata that it retrieves from the database to the second computing device such that a user of the second computing device may view information about the entity. The second computing device may receive the virtual identifier of the entity and the metadata and display the virtual identifier and/or the metadata. Displaying this data to the user after the first computing device receives the transaction request may illustrate to the user that received the physical entity that the user now owns the correct entity and that the entity has indeed been authenticated. Instead or additionally, the second computing device may store the virtual identifier and the metadata in an application (e.g., an application that provides inventory management and tracking).

As described above, using a centralized or distributed ledger to prove ownership of physical entities may enable a computing device to maintain a record of a chain of ownership of a particular entity. For instance, the first computing device may receive, from a third computing device, a history request for a chain of ownership for the entity that was transferred to the second user account. The history request may include the virtual identifier for the token. Upon receiving the request, the first computing device may use the virtual identifier as an index and search the ledger for records that contain the virtual identifier. The first computing device may identify any records (or blocks in the case in which the ledger is a blockchain) that contain the virtual identifier and identify and retrieve any account identifiers that indicate the previous owners of the entity from the records. The first computing device may transmit the account identifiers to the requesting computing device such that a user at the computing device may view a history of the entity's owners or possessors. Because the ownership history may be stored on a ledger such as a blockchain, the user can be reasonably certain the ownership history is accurate and has not been tampered with.

Figure 5:
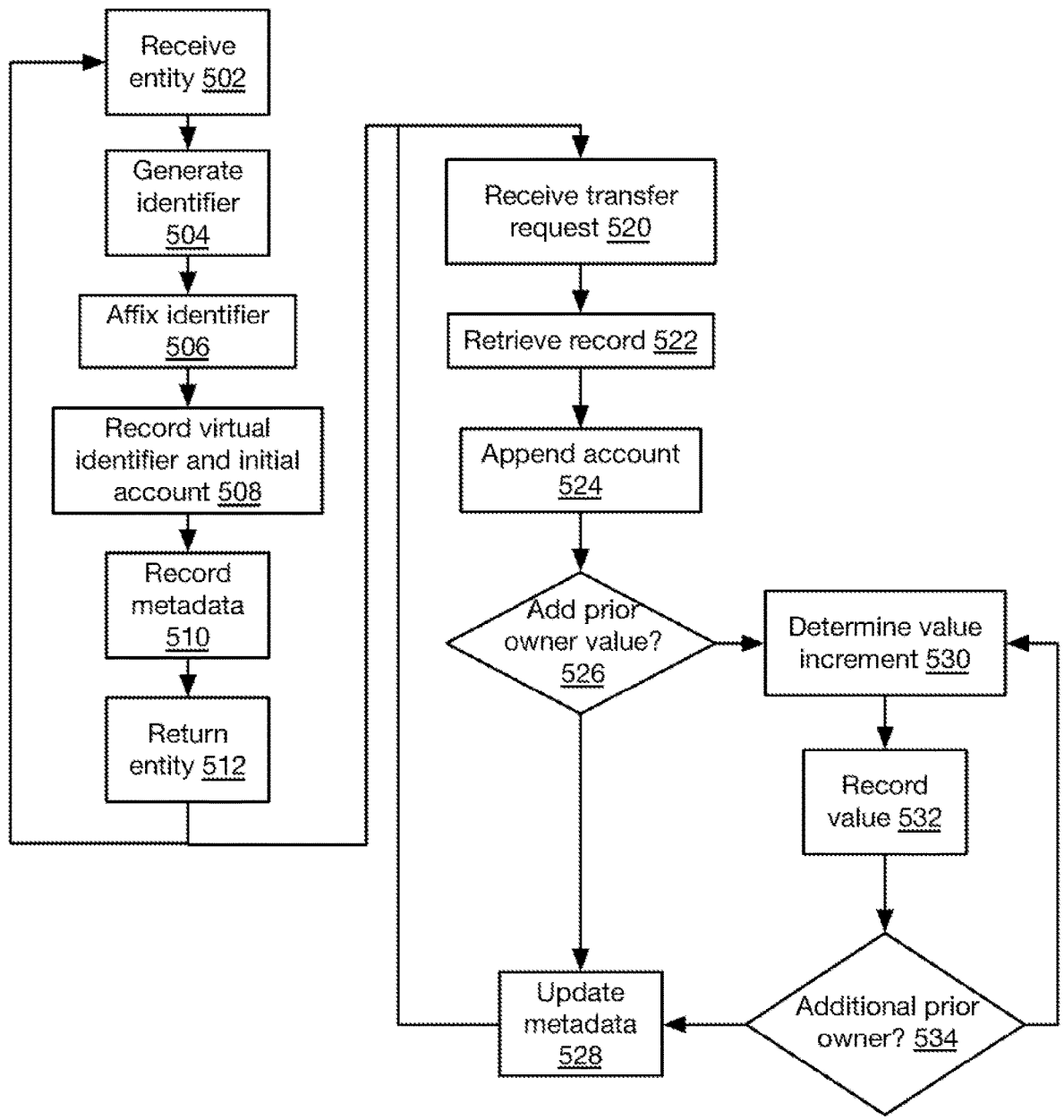
FIG. 5 is a flow chart of an implementation of a method for providing distributed entity tracking.

FIG. 5 is a flow chart of an implementation of a method for providing distributed entity tracking with distribution of incremental values. At step 502, in some implementations, a system may receive a physical entity. The entity may be received from a manufacturer or originator, or from a possessor or owner wishing to start a tracking chain of ownership. At step 504, a virtual identifier may be generated for the entity, and at step 506, the virtual identifier may be affixed to the entity. In some implementations, an identification of the entity may be provided at step 502 without providing the physical entity to the system; this may allow for remote users to generate labels or virtual identifiers and affix them to entities on their own. As discussed above, affixing a virtual identifier to an entity may be done physically (e.g. with a label, painting, marking, engraving, or otherwise) or virtually (e.g. with firmware, OTP memory, etc.).

At step 508, the virtual identifier and a user or device account identifier may be recorded to a centralized or distributed ledger. In some implementations, the virtual identifier may be used as an address within the ledger, or may be used to derive an address (e.g. a hash of the virtual identifier). In other implementations, the address may be stored separately, e.g. in a metadata database, and may be retrieved prior to recording the virtual identifier and user identifier.

In some implementations, at step 510, metadata of the physical entity may be recorded to a database. The database may be separate from the centralized or distributed ledger. In some implementations, the database entry may comprise an address in the centralized or distributed ledger at which ownership records for the virtual identifier and corresponding physical entity may be located. At step 512, in some implementations, the physical entity may be returned to the owner or possessor, if it was provided for step 502.

Subsequently, at step 520, the system may receive a request to record transfer of a physical entity to a second user or device account. The request may comprise a virtual identifier of the physical entity and a user account identifier. In some implementations, the request may be accompanied by a value to be decremented from the user account (e.g. a transaction fee or "gas", and/or as a cost for the trade of possession or ownership of the entity).

At step 522, in some implementations, the system may retrieve the corresponding record within the ledger. Retrieving the record may comprise reading a record at an address based on or derived from the virtual identifier in the request, and/or from an address obtained from a metadata database using the virtual identifier.

At step 524, the user account identifier may be appended to the chain of owners or possessors in the record. Appending the account identifier may comprise creating a new transaction including the user account identifier, or a transaction including the virtual identifier and the chain of user account identifiers, and recording the transaction on the ledger.

At step 526, in some implementations, the system may determine whether prior user accounts in the chains are to have values incremented. If not, then in some implementations at step 528, other records may be updated (e.g. metadata in a metadata database, etc.). A confirmation may be provided to the device(s) of the user or users.

If incremental values are to be added, then at step 530, the system may determine a value for the prior user account possessing or owning the entity, and at step 532, may execute a transaction incrementing a value associated with that user account by the determined value. In some implementations, a value associated with the user account in the request (e.g. the user account gaining possession or ownership of the entity) may be decremented by the determined value. In other implementations, the value may be decremented based on an aggregate incremented value applied to each other user account. At step 534, the system may determine whether additional prior user accounts exist in the chain of ownership or possession. If so, steps 530-534 may be repeated iteratively. Metadata for the virtual identifier may be updated at step 528, and steps 520-534 and/or 502-512 may be repeated for additional requests and/or entities. Accordingly, the systems and methods discussed herein provide for secure and authenticated tracking of entity possession via a lightweight centralized or distributed ledger.

Ownership records of different entities may be recorded on an immutable ledger such that provenance of the entities is verifiable and a user cannot create or counterfeit an entity. In some implementations, the system may store metadata of entities in a separate database that may store records for each entity and correspond to the respective entity's virtual identifier, enabling the ledger records to contain much less data, saving memory resources and the energy that is required to maintain the ledger. In some implementations, distributed incremental values may be provided to members of an ownership or possession chain of an entity, which may encourage compliance, reporting of ownership transfer, and encourage additional transfers.

In a first aspect, the present disclosure is directed to a method for distributed entity tracking. The method includes generating, by a first computing device, a virtual identifier for a physical entity to be tracked, the virtual identifier affixed to the physical entity. The method also includes recording, by the first computing device, the virtual identifier and an identification of a first user account in a centralized or distributed ledger. The method also includes subsequently receiving, by the first computing device, an identification of the virtual identifier and a second user account. The method also includes recording, by the first computing device, transfer of the virtual identifier to the second user account in the centralized or distributed ledger, the record comprising the virtual identifier and account identifiers of the first user account and the second user account.

In some implementations, the virtual identifier is encoded on a label affixed to the physical entity. In some implementations, the method includes recording metadata of the physical entity in association with the virtual identifier in a database separate from the centralized or distributed ledger. In a further implementation, the method includes retrieving the metadata of the physical entity from the database. In a still further implementation, the method includes updating, by the first computing device, an ownership field of a record associated with the physical entity stored in the database to include the account identifier of the second user account.

In some implementations, the method includes subsequently receiving the identification of the virtual identifier and the second user account further comprises receiving a request to execute a transaction transferring ownership of the physical entity from the first user account to the second user account, the request comprising the virtual identifier and the identification of the second user account. In a further implementation, the request to execute the transaction is transmitted to the first computing device responsive to transfer of possession of the physical entity from a first user associated with the first user account to a second user associated with the second user account.

In some implementations, the method includes incrementing a value associated with the first user account by a first value, and incrementing a value associated with the second user account by a second value. In a further implementation, the method includes incrementing a value associated with a third user account by a third value, the third user account associated with the virtual identifier prior to the first user account. In a still further implementation, the third value exceeds the first value.

In a second aspect, the present disclosure is directed to a system, comprising a first computing device comprising a network interface and a processor. The processor is configured to: generate a virtual identifier for a physical entity to be tracked, the virtual identifier affixed to the physical entity; record the virtual identifier and an identification of a first user account in a centralized or distributed ledger; subsequently receive, via the network interface, an identification of the virtual identifier and a second user account; and record transfer of the virtual identifier to the second user account in the centralized or distributed ledger, the record comprising the virtual identifier and account identifiers of the first user account and the second user account.

In some implementations, the virtual identifier is encoded on a label affixed to the physical entity. In some implementations, the processor is further configured to record metadata of the physical entity in association with the virtual identifier in a database separate from the centralized or distributed ledger. In a further implementation, the processor is further configured to retrieve the metadata of the physical entity from the database. In a still further implementation, the processor is further configured to update an ownership field of a record associated with the physical entity stored in the database to include the account identifier of the second user account.

In some implementations, the processor is further configured to receive, via the network interface, a request to execute a transaction transferring ownership of the physical entity from the first user account to the second user account, the request comprising the virtual identifier and the identification of the second user account. In a further implementation, the request to execute the transaction is transmitted to the first computing device responsive to transfer of possession of the physical entity from a first user associated with the first user account to a second user associated with the second user account.

In some implementations, the processor is further configured to increment a value associated with the first user account by a first value, and incrementing a value associated with the second user account by a second value. In a further implementation, the processor is further configured to increment a value associated with a third user account by a third value, the third user account associated with the virtual identifier prior to the first user account. In a still further implementation, the third value exceeds the first value.

B. Computing Environment

Having discussed specific embodiments of the present solution, it may be helpful to describe aspects of the operating environment as well as associated system components (e.g., hardware elements) in connection with the methods and systems described herein.

Figure 6A:
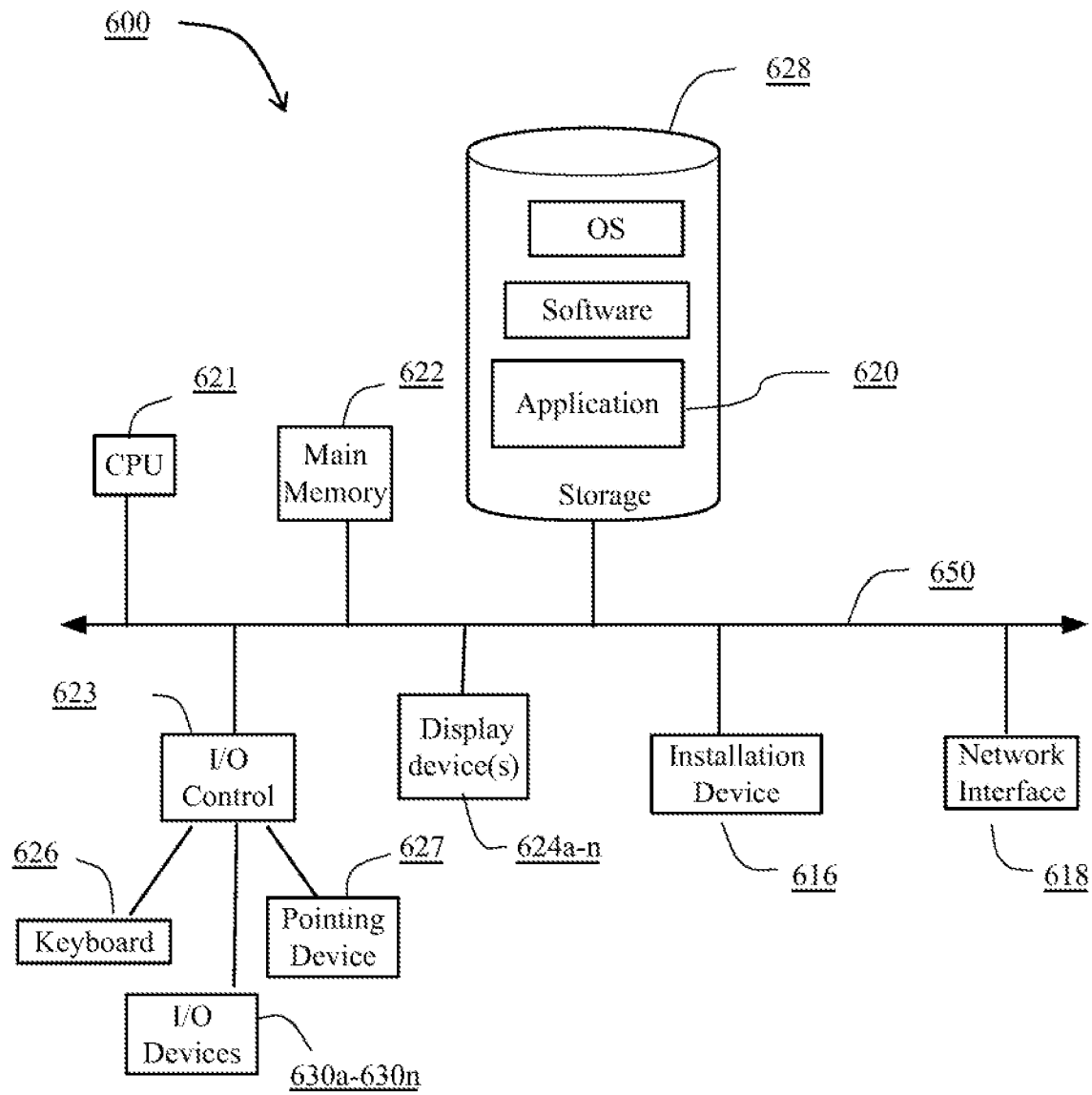
FIGS. 6A and 6B are block diagrams depicting embodiments of computing devices useful in connection with the methods and systems described herein.
Figure 6B:
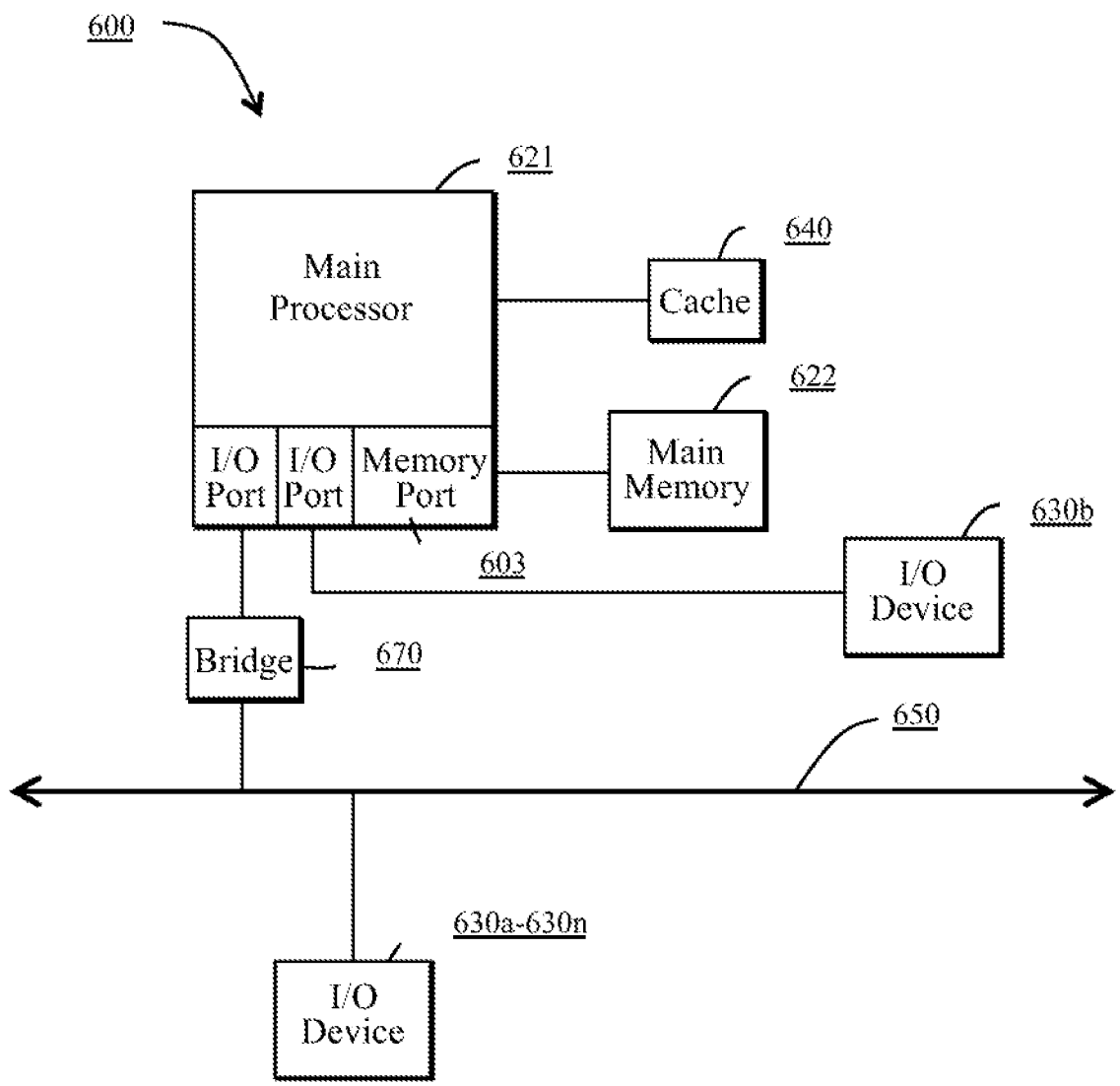

The systems discussed herein may be deployed as and/or executed on any type and form of computing device, such as a computer, network device or appliance capable of communicating on any type and form of network and performing the operations described herein. FIGS. 6A and 6B depict block diagrams of a computing device 600 useful for practicing an embodiment of the wireless communication devices 602 or the access point 606. As shown in FIGS. 6A and 6B, each computing device 600 includes a central processing unit 621, and a main memory unit 622. As shown in FIG. 6A, a computing device 600 may include a storage device 628, an installation device 616, a network interface 618, an I/O controller 623, display devices 624a-624n, a keyboard 626 and a pointing device 627, such as a mouse. The storage device 628 may include, without limitation, an operating system and/or software. As shown in FIG. 6B, each computing device 600 may also include additional optional elements, such as a memory port 603, a bridge 670, one or more input/output devices 630a-630n (generally referred to using reference numeral 630), and a cache memory 640 in communication with the central processing unit 621.

The central processing unit 621 is any logic circuitry that responds to and processes instructions fetched from the main memory unit 622. In many embodiments, the central processing unit 621 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 600 may be based on any of these processors, or any other processor capable of operating as described herein.

Main memory unit 622 may be one or more memory chips capable of storing data and allowing any storage location to be directly accessed by the microprocessor 621, such as any type or variant of Static random access memory (SRAM), Dynamic random access memory (DRAM), Ferroelectric RAM (FRAM), NAND Flash, NOR Flash and Solid State Drives (SSD).

The main memory 622 may be based on any of the above described memory chips, or any other available memory chips capable of operating as described herein. In the embodiment shown in FIG. 6A, the processor 621 communicates with main memory 622 via a system bus 680 (described in more detail below). FIG. 6B depicts an embodiment of a computing device 600 in which the processor communicates directly with main memory 622 via a memory port 603. For example, in FIG. 6B the main memory 622 may be DRDRAM.

FIG. 6B depicts an embodiment in which the main processor 621 communicates directly with cache memory 640 via a secondary bus, sometimes referred to as a backside bus. In other embodiments, the main processor 621 communicates with cache memory 640 using the system bus 680. Cache memory 640 typically has a faster response time than main memory 622 and is provided by, for example, SRAM, BSRAM, or EDRAM. In the embodiment shown in FIG. 6B, the processor 621 communicates with various I/O devices 630 via a local system bus 680. Various buses may be used to connect the central processing unit 621 to any of the I/O devices 630, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 624, the processor 621 may use an Advanced Graphics Port (AGP) to communicate with the display 624. FIG. 6B depicts an embodiment of a computer 600 in which the main processor 621 may communicate directly with I/O device 630b, for example via HYPERTRANSPORT, RAPIDIO, or INFINIBAND communications technology. FIG. 6B also depicts an embodiment in which local busses and direct communication are mixed: the processor 621 communicates with I/O device 630a using a local interconnect bus while communicating with I/O device 630b directly.

A wide variety of I/O devices 630a-630n may be present in the computing device 600. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 623 as shown in FIG. 6A. The I/O controller may control one or more I/O devices such as a keyboard 626 and a pointing device 627, e.g., a mouse or optical pen. Furthermore, an I/O device may also provide storage and/or an installation medium 616 for the computing device 600. In still other embodiments, the computing device 600 may provide USB connections (not shown) to receive handheld USB storage devices such as the USB Flash Drive line of devices manufactured by Twintech Industry, Inc. of Los Alamitos, California.

Referring again to FIG. 6A, the computing device 600 may support any suitable installation device 616, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 600 may further include a storage device, such as one or more hard disk drives or redundant arrays of independent disks, for storing an operating system and other related software, and for storing application software programs such as any program or software 620 for implementing (e.g., configured and/or designed for) the systems and methods described herein. Optionally, any of the installation devices 616 could also be used as the storage device. Additionally, the operating system and the software can be run from a bootable medium.

Furthermore, the computing device 600 may include a network interface 618 to interface to the network 604 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b. IEEE 802.11g, IEEE 802.11n. IEEE 802.1 lac. IEEE 802.11ad, CDMA, GSM, WiMax and direct asynchronous connections). In one embodiment, the computing device 600 communicates with other computing devices 600' via any type and/or form of gateway or tunneling protocol such as Secure Socket Layer (SSL) or Transport Layer Security (TLS). The network interface 618 may include a built-in network adapter, network interface card, PCMCIA network card, card bus network adapter, wireless network adapter, USB network adapter, modem or any other device suitable for interfacing the computing device 600 to any type of network capable of communication and performing the operations described herein.

In some embodiments, the computing device 600 may include or be connected to one or more display devices 624a-624n. As such, any of the I/O devices 630a-630n and/or the I/O controller 623 may include any type and/or form of suitable hardware, software, or combination of hardware and software to support, enable or provide for the connection and use of the display device(s) 624a-624n by the computing device 600. For example, the computing device 600 may include any type and/or form of video adapter, video card, driver, and/or library to interface, communicate, connect or otherwise use the display device(s) 624a-624n. In one embodiment, a video adapter may include multiple connectors to interface to the display device(s) 624a-624n. In other embodiments, the computing device 600 may include multiple video adapters, with each video adapter connected to the display device(s) 624a-624n. In some embodiments, any portion of the operating system of the computing device 600 may be configured for using multiple displays 624a-624n. One ordinarily skilled in the art will recognize and appreciate the various ways and embodiments that a computing device 600 may be configured to have one or more display devices 624a-624n.

In further embodiments, an I/O device 630 may be a bridge between the system bus 680 and an external communication bus, such as a USB bus, an Apple Desktop Bus, an RS-232 serial connection, a SCSI bus, a FireWire bus, a FireWire 600 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 600 of the sort depicted in FIGS. 6A and 6B may operate under the control of an operating system, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond. Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 600 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 600 has sufficient processor power and memory capacity to perform the operations described herein.

In some embodiments, the computing device 600 may have different processors, operating systems, and input devices consistent with the device. For example, in one embodiment, the computing device 600 is a smart phone, mobile device, tablet or personal digital assistant. In still other embodiments, the computing device 600 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method, comprising:
   generating, by a first computing device, a virtual identifier for a physical entity to be tracked, the virtual identifier affixed to the physical entity;
   recording, by the first computing device, the virtual identifier and an identification of a first user account in a centralized or distributed ledger;
   subsequently receiving, by the first computing device, an identification of the virtual identifier and a second user account; and
   recording, by the first computing device, transfer of the virtual identifier to the second user account in the centralized or distributed ledger, the record comprising the virtual identifier and account identifiers of the first user account and the second user account.

2. The method of claim 1, wherein the virtual identifier is encoded on a label affixed to the physical entity.

3. The method of claim 1, further comprising recording metadata of the physical entity in association with the virtual identifier in a database separate from the centralized or distributed ledger.

4. The method of claim 3, wherein recording transfer of the virtual identifier to the second user account further comprises retrieving the metadata of the physical entity from the database.

5. The method of claim 4, wherein recording transfer of the virtual identifier to the second user account further comprises updating, by the first computing device, an ownership field of a record associated with the physical entity stored in the database to include the account identifier of the second user account.

6. The method of claim 1, wherein subsequently receiving the identification of the virtual identifier and the second user account further comprises receiving a request to execute a transaction transferring ownership of the physical entity from the first user account to the second user account, the request comprising the virtual identifier and the identification of the second user account.

7. The method of claim 6, wherein the request to execute the transaction is transmitted to the first computing device responsive to transfer of possession of the physical entity from a first user associated with the first user account to a second user associated with the second user account.

8. The method of claim 1, wherein recording transfer of the virtual identifier to the second user account in the centralized or distributed ledger further comprises incrementing a value associated with the first user account by a first value, and incrementing a value associated with the second user account by a second value.

9. The method of claim 8, wherein recording transfer of the virtual identifier to the second user account in the centralized or distributed ledger further comprises incrementing a value associated with a third user account by a third value, the third user account associated with the virtual identifier prior to the first user account.

10. The method of claim 9, wherein the third value exceeds the first value.

11. A system, comprising:
    a first computing device comprising a network interface and a processor configured to:
       generate a virtual identifier for a physical entity to be tracked, the virtual identifier affixed to the physical entity,
       record the virtual identifier and an identification of a first user account in a centralized or distributed ledger,
       subsequently receive, via the network interface, an identification of the virtual identifier and a second user account, and
       record transfer of the virtual identifier to the second user account in the centralized or distributed ledger, the record comprising the virtual identifier and account identifiers of the first user account and the second user account.

12. The system of claim 11, wherein the virtual identifier is encoded on a label affixed to the physical entity.

13. The system of claim 11, wherein the processor is further configured to record metadata of the physical entity in association with the virtual identifier in a database separate from the centralized or distributed ledger.

14. The system of claim 13, wherein the processor is further configured to retrieve the metadata of the physical entity from the database.

15. The system of claim 14, wherein the processor is further configured to update an ownership field of a record associated with the physical entity stored in the database to include the account identifier of the second user account.

16. The system of claim 11, wherein the processor is further configured to receive, via the network interface, a request to execute a transaction transferring ownership of the physical entity from the first user account to the second user account, the request comprising the virtual identifier and the identification of the second user account.

17. The system of claim 16, wherein the request to execute the transaction is transmitted to the first computing device responsive to transfer of possession of the physical entity from a first user associated with the first user account to a second user associated with the second user account.

18. The system of claim 11, wherein the processor is further configured to increment a value associated with the first user account by a first value, and incrementing a value associated with the second user account by a second value.

19. The system of claim 18, wherein the processor is further configured to increment a value associated with a third user account by a third value, the third user account associated with the virtual identifier prior to the first user account.

20. The system of claim 19, wherein the third value exceeds the first value.

* * * * *